United States Patent
Ishida et al.

[11] Patent Number: 6,146,752
[45] Date of Patent: Nov. 14, 2000

[54] MAGNETO-OPTICAL RECORDING MEDIUM

[75] Inventors: Masaya Ishida; Takeo Kawase, both of Nagano, Japan

[73] Assignee: Seiko Epson Corporation, Japan

[21] Appl. No.: 09/011,675

[22] PCT Filed: Jun. 13, 1997

[86] PCT No.: PCT/JP97/02064

§ 371 Date: Jun. 15, 1998

§ 102(e) Date: Jun. 15, 1998

[87] PCT Pub. No.: WO97/48094

PCT Pub. Date: Dec. 18, 1997

[30] Foreign Application Priority Data

Jun. 14, 1996 [JP] Japan ................................. 8-154684

[51] Int. Cl.[7] ........................................................ G11B 5/66
[52] U.S. Cl. .................. 428/332; 428/336; 428/694 ML; 428/694 SC; 428/694 EC; 428/694 MM; 428/900; 369/13
[58] Field of Search ..................................... 428/332, 336, 428/694 ML, 694 SC, 694 EC, 694 MM, 900; 365/13

[56] References Cited

U.S. PATENT DOCUMENTS 5,736,265 4/1998 Tanaka ............................... 428/694 ML

FOREIGN PATENT DOCUMENTS

| 60-154339 | 8/1985 | Japan . |
| 62-184644 | 8/1987 | Japan . |
| 4-219642 | 8/1992 | Japan . |
| 9-50609 | 2/1997 | Japan . |
| 9-50611 | 2/1997 | Japan . |

Primary Examiner—Leszek Kiliman
Attorney, Agent, or Firm—Harness, Dickey & Pierce, P.L.C.

[57] ABSTRACT

A magneto-optical recording medium permitting satisfactory recording of information even at a small magnetic field in magnetic field modulation recording. The magneto-optical recording medium comprises a recording film formed by deposition of a recording layer and an antiferromagnetic layer. The thickness of the antiferromagnetic layer is 150 angstroms or less. When the Curie temperature of the recording layer is Tc1 and the Neel temperature of the antiferromagnetic layer is Tc2, Tc2 is higher than Tc1.

17 Claims, 2 Drawing Sheets

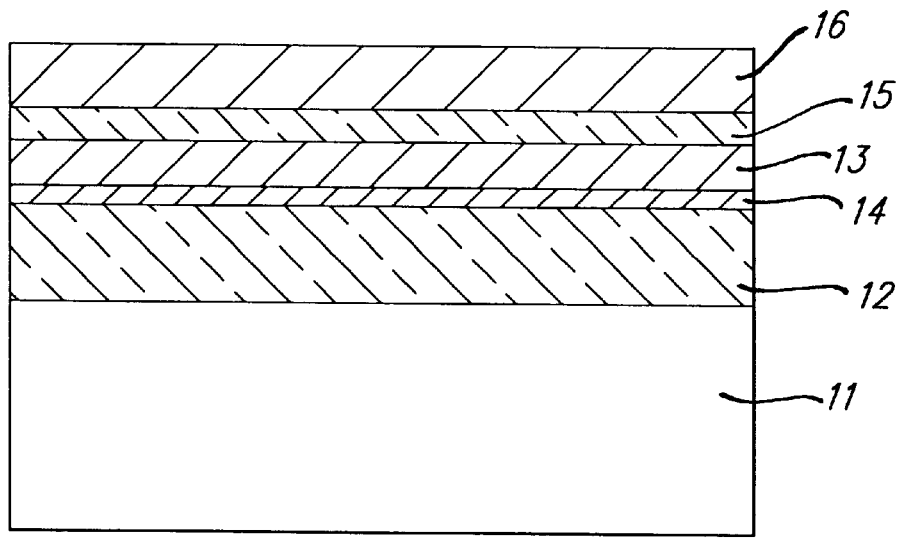
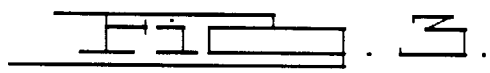
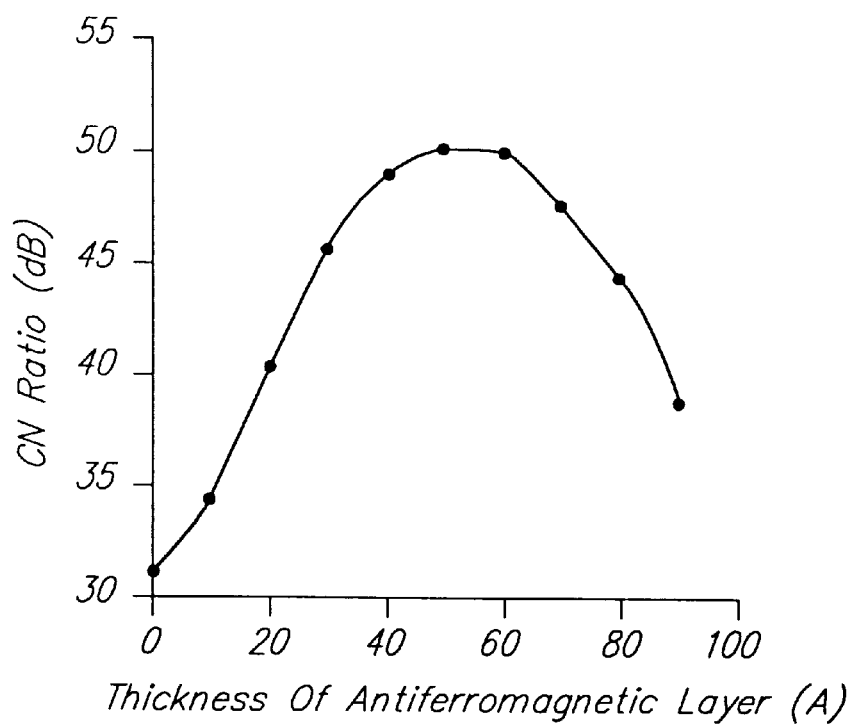
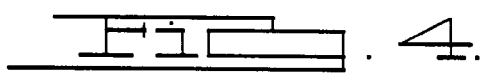

MAGNETO-OPTICAL RECORDING MEDIUM

TECHNICAL FIELD

The present invention relates to magneto-optical recording media for performing recording by means of light. In particular, the present invention relates to a magneto-optical recording medium using a magnetic field modulation system as a recording system.

BACKGROUND ART

Recording systems in magneto-optical recording media are roughly classified into optical modulation systems and magnetic field modulation systems. Magnetic field modulation systems enable easy overwriting and are suitable for mark edge recording. The magnetic field modulation systems, however, require magnetic heads, and the inductance of the heads must be reduced for switching a large current flow when the magnetic field is switched at a high speed. In order to increase the recording magnetic field as much as possible by bringing the magnetic head as close as possible to the recording film of a recording medium, use of a floating magnetic head is effective in practice as described in Japanese Patent Laid-Open No. 63-217548.

In any case, it is preferable that magneto-optical recording media for magnetic field modulation systems are capable of recording at a low magnetic field. The reduction of the recording magnetic field is achieved by optimizing the heavy rare earth metal content in a ternary recording film composed of rare earth elements, Fe and Co, as described in page 53 of "The Paper of Technical Meeting on Magnetics MAG-86-95"; a fourth element such as Nd is added to enhance magnetic characteristics at low magnetic fields as described in page 268 of "Digests of the p11th Annual Conference on Magnetics in Japan"; a response to external magnetic fields is improved by reducing a stray field by exchange coupling of magnetic fields with different compositions as described in Japanese Patent Laid-Open No. 62-128040; and a vertically magnetized film is stacked with a planar magnetic film to effectively collect a magnetic flux to the vertically magnetized film and thus to reduce the magnetic modulation field as described in Japanese Patent Laid-Open No. 61-188758.

It is, however, difficult to reduce the magnetic modulation field to less than ±100 Oe by these prior art technologies, and addition of the fourth element and stacking with the planar magnetic film will deteriorate readout characteristics. The present inventors have discovered that the magnetic field for modulation can be reduced by forming an ultra-thin magnetic layer adjoining the recording layer, wherein the Curie point of the magnetic field is higher than that of the recording layer, and have applied for a patent (Japanese Patent Laid-Open No. 6-309711). Also, the present inventors have discovered that the magnetic modulation field is further reduced by a combination of a recording layer and an ultra-thin magnetic layer, in which the heavy rare earth metal contents in the recording layer are reduced. Although the recording magnetic modulation field has been considerably reduced by these inventions, a further reduction is required.

Accordingly, an object of the present invention is to provide a magneto-optical recording medium for magnetic field modulation systems, capable of satisfactory recording by a smaller magnetic modulation field than that of conventional technologies.

SUMMARY OF THE INVENTION (1) The present invention is characterized in that a magneto-optical recording medium comprises a recording film formed by deposition of a recording layer and an antiferromagnetic layer. Occurrence of a maze magnetic field is suppressed by the effect of the antiferromagnetic layer, hence the S/N ratio of output signal is improved due to the increased carrier level of the output signal. In the present invention, the recording film means a combination of the recording layer and the antiferromagnetic layer or a portion, which participates in the recording, including the recording layer and the antiferromagnetic layer.

(2) It is preferable that the thickness of the antiferromagnetic layer be 150 angstroms or less. The magnetic field sensitivity is improved thereby.

(3) Supposing that the Curie temperature of the recording layer is Tc1 and the Neel temperature is Tc2, it is preferable that Tc2 be higher than Tc1. The magnetic field sensitivity is thereby improved.

(4) It is preferable that the antiferromagnetic layer be FeMn or NiO.

(5) It is preferable that the antiferromagnetic layer be at least one alloy selected from the group consisting of NiMn, IrMn, PtMn, PdMn, RhMn, CrAl, and CrGa.

Such a configuration significantly improves the magnetic field sensitivity and thus enables recording with a weak magnetic field. As a result, the configuration has some advantages, that is, miniaturization of the magnetic head, significantly low electric power consumption in the magnetic head, and an inexpensive driving circuit of the magnetic head. Further, a magneto-optical recording medium enabling stable recording, even if the distance between the magnetic head and the magneto-optical recording medium changes, is provided.

BRIEF DESCRIPTION OF DRAWINGS

FIG. 3 is a cross-sectional view of an embodiment of a magneto-optical recording medium in accordance with the present invention.

FIG. 4 is a graph illustrating a relationship between the thickness of the antiferromagnetic layer and the CN ratio in a magneto-optical recording medium in accordance with the present invention.

BEST MODE FOR CARRYING OUT THE INVENTION

The magneto-optical recording medium in accordance with the present invention will now be described in detail with reference to preferred embodiments illustrated in the attached drawings.

(Embodiment 1)

Figure 1:
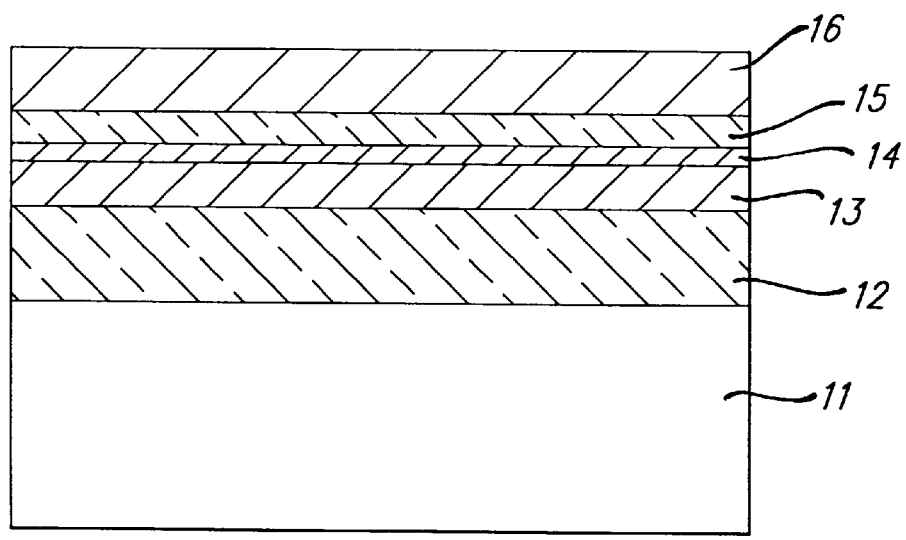
FIG. 1 is a cross-sectional view of an embodiment of a magneto-optical recording medium in accordance with the present invention.

FIG. 1 shows a cross-sectional configuration of a magneto-optical recording medium in accordance with the present invention which permits recording based on the magnetic field modulation. A first dielectric layer 12, a recording layer 13, an antiferromagnetic layer 14, a second dielectric layer 15 and a reflection layer 16 are deposited on a transparent substrate 11 in that order. Describing an example of each layer, the transparent substrate 11 is a polycarbonate (PC) substrate, the first dielectric layer 12 and the second dielectric layer 15 are AlSiN layers, the recording layer 13 is a TbFeCo layer, the antiferromagnetic layer 14 is a FeMn layer, and the reflection layer 15 is an Al layer.

A rare earth-transition metal alloy having a composition of $Tb_{0.16}(Fe_{0.96}Co_{0.04})_{0.84}$ was used as the recording medium 13, wherein the suffix represents atomic ratio. The thin film was deposited by a magnetron DC sputtering process using a cast alloy target under conditions of an argon gas pressure of 1.2 mTorr, and an input power of 300 W. The curie temperature is 150° C. An alloy having a composition of $Fe_{0.50}Mn_{0.50}$ was used as the antiferromagnetic layer 14. The thin film was deposited by a magnetron DC sputtering process using a cast alloy target under conditions of an argon gas pressure of 0.4 mTorr, and an input power of 100 W. The temperature at which the magnetic characteristics are lost, that is, the Neel temperature is about 200° C.

In production of the magneto-optical recording medium having the configuration shown in FIG. 1, the first dielectric layer 12, the recording layer 13, the antiferromagnetic layer 14, the second dielectric layer 15 and the reflection layer 16 are deposited on the transparent substrate 11 in that order. The material for the first dielectric layer 12 and the second dielectric layer 15 is, for example, AlSiN, and the conditions of the sputtering process include, for example, a sputtering gas composed of 60% Ar and 40% $N_2$, a pressure of 1.7 mTorr, and an input power of RF 2500 W. An AlSi alloy target is used as the target. The reflection layer 16 was deposited using an Al target under the conditions of an argon gas pressure of 1.5 mTorr and a power of 660 W.

Figure 2:
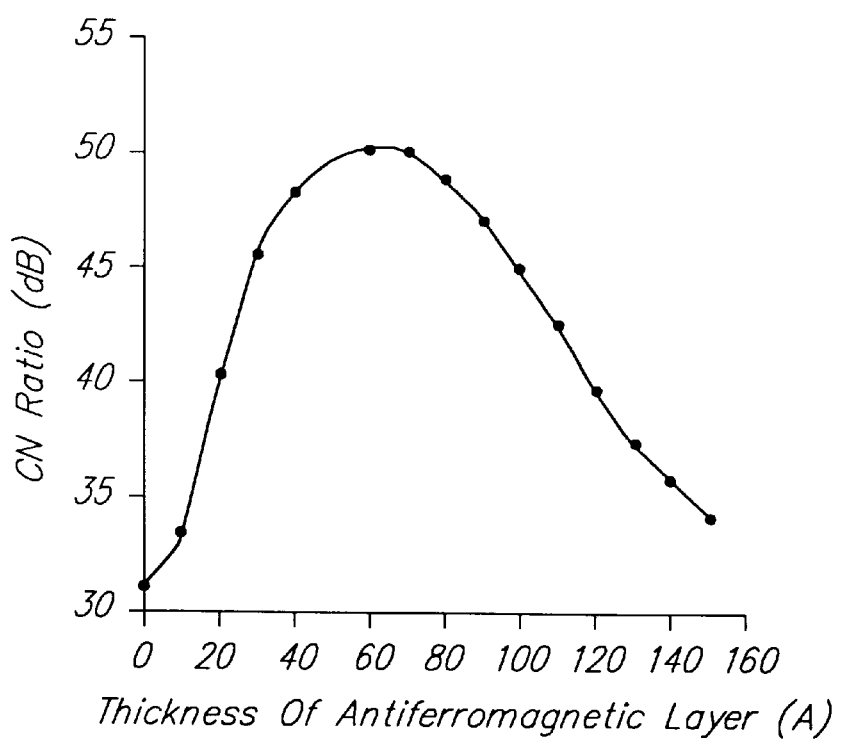
FIG. 2 is a graph illustrating a relationship between the thickness of the antiferromagnetic layer and the CN ratio in a magneto-optical recording medium in accordance with the present invention.

Magneto-optical recording media in accordance with the present invention were prepared, in which thicknesses of the first dielectric layer 12, the recording medium 13, the second dielectric layer 15, and the reflection layer 16 were 600 Å, 200 Å, 200 Å, and 600 Å, respectively, while the thickness of each antiferromagnetic layer 14 was varied from 0 Å to 150 Å with an increment of 10 Å under the above-mentioned conditions, and the sensitivity of each magneto-optical recording medium to the modulation magnetic field was 11G measured. The thickness of the antiferromagnetic layer 14 is not the observed value, and is determined by the sputtering time which is calculated from the previously determined deposition rate of the antiferromagnetic layer 14. The recording of the sensitivity was carried out at a linear recording velocity of 1.4 m/s, a recording frequency of 720 kHz, a recording laser power of 5.8 mW, and a modulation magnetic field of ±35 Oe. The relationship between the thickness of the antiferromagnetic layer 14 and the CN ratio of the output signal is shown in FIG. 2. The formation of an ultra-thin antiferromagnetic layer 14 with a thickness of 10 Å is clearly effective. The CN ratio, which is recorded at a modulation magnetic field of ±35 Oe, greatly depends on the thickness of the antiferromagnetic layer 14, the thickness in a range from 10 Å to 150 Å is effective, and a significantly high CN ratio is achieved in a range from approximately 30 Å to 70 Å. At a thickness of 80 Å or more, the CN ratio decreases as the thickness increases. Since the CN ratio of the output signal when the thickness of the antiferromagnetic layer is 150 Å is higher than that when no antiferromagnetic layer is formed, the magnetic field sensitivity is clearly improved at a thickness of 150 Å.

The mechanism of the improved magnetic field sensitivity of the deposited recording layer and antiferromagnetic layer shown in this embodiment is assumed to be as follows. The magnetization value must be high in order to achieve recording at a low magnetic field, and the recording layer plays such a role. The TM-dominant magnetic layer has a relatively high magnetization value until a temperature very near the Curie temperature and functions as a driving force for forming a magnetic domain, wherein the words "TM-dominant" mean transition metal sublattice magnetization dominant. Since maze domains are easily formed in such a single recording layer, a good MO output signal cannot be obtained, but (the) formation of the maze domain is suppressed by the effect of the antiferromagnetic layer. A film having a high Neel temperature is selected as the antiferromagnetic layer. Since the antiferromagnetic layer has a magnetization value of zero, a single magnetic domain structure can be easily formed. As a result, the maze domain structure is suppressed by depositing the antiferromagnetic layer on the recording layer.

In this embodiment, TM-dominant TbFeCo is described as the recording film. The magnetic field sensitivity is also improved by using noble metal/transition metal multilayers such as Pd/Co and Pt/Co, which have inferior recording characteristics due to high magnetization values, as well as TM-dominant DyFeCo, TM-dominant GdFeCo, TM-dominant TbDyFeCo, TbGdFeCo, and DyGdFeCo. In this embodiment, the improvement in the magnetic field sensitivity by the magnetic modulation method is described, and a high CN ratio at a low magnetic field is also achieved in recording by the light intensity modulation method. Accordingly, the present invention is not limited to a recording medium with a magnetic field modulation method.

(Embodiment 2)

FIG. 3 shows a cross-sectional configuration of another embodiment of the magneto-optical recording medium in accordance with the present invention. A first dielectric layer 12, an antiferromagnetic layer 14, a recording layer 13, a second dielectric layer 15, and a reflection layer 16 are deposited on a transparent substrate 11 in that order. Describing an example of each layer, the transparent substrate 11 is a polycarbonate (PC) substrate, the first dielectric layer 12 and the second dielectric layer 15 are AlSiN layers, the antiferromagnetic layer 14 is a NiO layer, the recording layer 13 is a TbFeCo layer, and the reflection layer 15 is an Al layer.

NiO was used as the antiferromagnetic layer 14. The thin film was deposited by a magnetron RF sputtering process using a cast alloy target under conditions of an argon gas pressure of 0.4 mTorr and an input power of 100 W. The temperature at which the magnetic characteristics are lost, that is, the Neel temperature is about 270° C. A magneto-optical recording medium was prepared as in the Embodiment 1, but the composition of the antiferromagnetic layer 14 and the order of the deposition are different from the Embodiment 1.

Magneto-optical recording media in accordance with the present invention were prepared, in which thicknesses of the first dielectric layer 12, the recording medium 13, the second dielectric layer 15, and the reflection layer 16 were 600 Å, 200 Å, 200 Å, and 600 Å, respectively, while the thickness of each antiferromagnetic layer 14 was varied from 0 Å to 90 Å with an increment of 10 Å, and the sensitivity of each magneto-optical recording medium to the modulation magnetic field was measured. The thickness of the antiferromagnetic layer 14 is not the observed value, and is determined by the sputtering time which is calculated from the previously determined deposition rate of the antiferromagnetic layer 14. The recording of the sensitivity was carried out at a linear recording velocity of 1.4 m/s, a recording frequency of 720 kHz, a recording laser power of 5.8 mW, and a modulation magnetic field of ±35 Oe. The relationship between the thickness of the antiferromagnetic layer 14 and the CN ratio of the output signal is shown in FIG. 4. The formation of an ultra-thin antiferromagnetic layer 14 with a thickness of 10 Å is clearly effective. The CN ratio, which is recorded at a modulation magnetic field of ±35 Oe, greatly depends on the thickness of the antiferromagnetic layer 14, the thickness in a range from 10 Å to 90 Å is effective, and a significantly high CN ratio is achieved in a range from approximately 20 Å to 80 Å. At a thickness of 70 Å or more, the CN ratio decreases as the thickness increases. An oxide such as NiO, as well as FeMn, as a material for the antiferromagnetic layer is clearly effective for improving the magnetic field sensitivity.

(Embodiment 3)

This embodiment describes cases using various antiferromagnetic layers. Magneto-optical recording media were prepared under the conditions shown in the Embodiment 1 other than the composition of the antiferromagnetic layer 14. As the antiferromagnetic layer, $Ni_{25}Mn_{75}$, $Ir_{22}Mn_{78}$, $Pt_{50}Mn_{50}$, $Pd_{50}Mn_{50}$, $Pt_{25}Pd_{25}Mn_{50}$, $Rh_{20}Mn_{80}$, $Cr_{70}Al_{30}$, and $Cr_{70}Ga_{30}$ where used. Magneto-optical recording media in accordance with the present invention were prepared, in which thicknesses of the first dielectric layer 12, the recording medium 13, the second dielectric layer 15, and the reflection layer 16 were 600 Å, 200 Å, 200 Å, and 600 Å, respectively, while the thickness of each antiferromagnetic layer 14 was varied from 0 Å to 150 Å with an increment of 10 Å, and the sensitivity of each magneto-optical recording medium to the modulation magnetic field was measured. The recording of the sensitivity was carried out at a linear recording velocity of 1.4 m/s, a recording frequency of 720 kHz, a recording laser power of 5.8 mW, and a modulation magnetic field of ±35 Oe. With the antiferromagnetic layer having any one of the above-mentioned compositions, a higher CN ratio was achieved compared with a medium without an antiferromagnetic layer. A significantly high CN ratio was achieved in a range from approximately 30 Å to 90 Å. The change in the CN ratio was almost the same as that when FeMn was used as the antiferromagnetic layer 14. These results demonstrate that high magnetic field sensitivity is achieved by depositing an ultra-thin antiferromagnetic layer regardless of its composition. The present invention is not limited to these embodiments, and it is clarified that the magnetic field sensitivity is improved by using an antiferromagnetic layer having a Neel temperature which is higher than the Curie temperature of the recording layer.

INDUSTRIAL APPLICABILITY

In magnetic field modulation recording systems, the magneto-optical recording medium can be used when the applied recording magnetic field information is small. Accordingly, the magnetic head can be miniaturized and consumption of the electrical power can be significantly reduced in the magneto-optical recording medium. Further, the magneto-optical recording medium can be used in states where the distance between the magnetic head and magneto-optical recording medium easily changes.

What is claimed is:

1. A magneto-optical recording medium comprising:
   a substrate;
   a first dielectric layer deposited on said substrate;
   a recording layer deposited on said first dielectric layer;
   an anti-ferromagnetic layer deposited on said recording layer;
   a second dielectric layer deposited on said anti-ferromagnetic layer; and
   a reflection layer deposited on said second dielectric layer, wherein said anti-ferromagnetic layer has a thickness in a range from about 30 to about 90 angstroms.

2. The magneto-optical recording medium of claim 1 wherein said substrate further comprises a polycarbonate substrate.

3. The magneto-optical recording medium of claim 1 wherein said first dielectric layer and said second dielectric layer further comprises AlSiN layers.

4. The magneto-optical recording medium of claim 1 wherein said recording layer further comprises a TbFeCo layer.

5. The magneto-optical recording medium of claim 1 wherein said anti-ferromagnetic layer further comprises a FeMn layer.

6. The magneto-optical recording medium of claim 1 wherein said anti-ferromagnetic layer further comprises a layer selected from the group including NiMn, IrMn, PtMn, PdMn, PtPdMn, RhMn, CrAl, and CrGa.

7. The magneto-optical recording medium of claim 1 wherein said reflection layer further comprises an Al layer.

8. The magneto-optical recording medium of claim 1 wherein a Neel temperature of said anti-ferromagnetic layer is greater than a Curie temperature of said recording layer.

9. A magneto-optical recording medium comprising:
   a substrate;
   a first dielectric layer deposited on said substrate;
   an anti-ferromagnetic layer deposited on said first dielectric layer;
   a recording layer deposited on said anti-ferromagnetic layer;
   a second dielectric layer deposited on said recording layer; and
   a reflection layer deposited on said second dielectric layer, wherein said anti-ferromagnetic layer has a thickness in a range from about 10 to about 90 angstroms.

10. The magneto-optical recording medium of claim 9 wherein said substrate further comprises a polycarbonate substrate.

11. The magneto-optical recording medium of claim 9 wherein said first dielectric layer and said second dielectric layer further comprises AlSiN layers.

12. The magneto-optical recording medium of claim 9 wherein said anti-ferromagnetic layer further comprises a NiO layer.

13. The magneto-optical recording medium of claim 9 wherein said anti-ferromagnetic layer further comprises a layer selected from the group including NiMn, IrMn, PtMn, PdMn, PtPdMn, RhMn, CrAl, and CrGa.

14. The magneto-optical recording medium of claim 9 wherein said recording layer further comprises a TbFeCo layer.

15. The magneto-optical recording medium of claim 9 wherein said reflection layer further comprises an Al layer.

16. The magneto-optical recording medium of claim 9 wherein a Neel temperature of said anti-ferromagnetic layer is greater than a Currie temperature of said recording layer.

17. The magneto-optical recording medium of claim 9 wherein said anti-ferromagnetic layer has a thickness in a range from about 20 to about 80 angstroms.

* * * * *

UNITED STATES PATENT AND TRADEMARK OFFICE
CERTIFICATE OF CORRECTION

PATENT NO : 6,146,752

DATED : November 14, 2000

INVENTOR(S) : Masaya Ishida, Takeo Kawase

It is certified that error appears in the above-identified patent and that said Letters Patent are hereby corrected as shown below:

Column 1, line 33, "p11th" should be --11th--
Column 3, line 10, "curie" should be --Curie--
Column 3, line 38, delete "11G"
Column 6, line 60, "Currie" should be --Curie--

Signed and Sealed this

Fifteenth Day of May, 2001

Attest:

NICHOLAS P. GODICI

Attesting Officer    Acting Director of the United States Patent and Trademark Office